_United States Patent Office_ 3,008,946
Patented Nov. 14, 1961

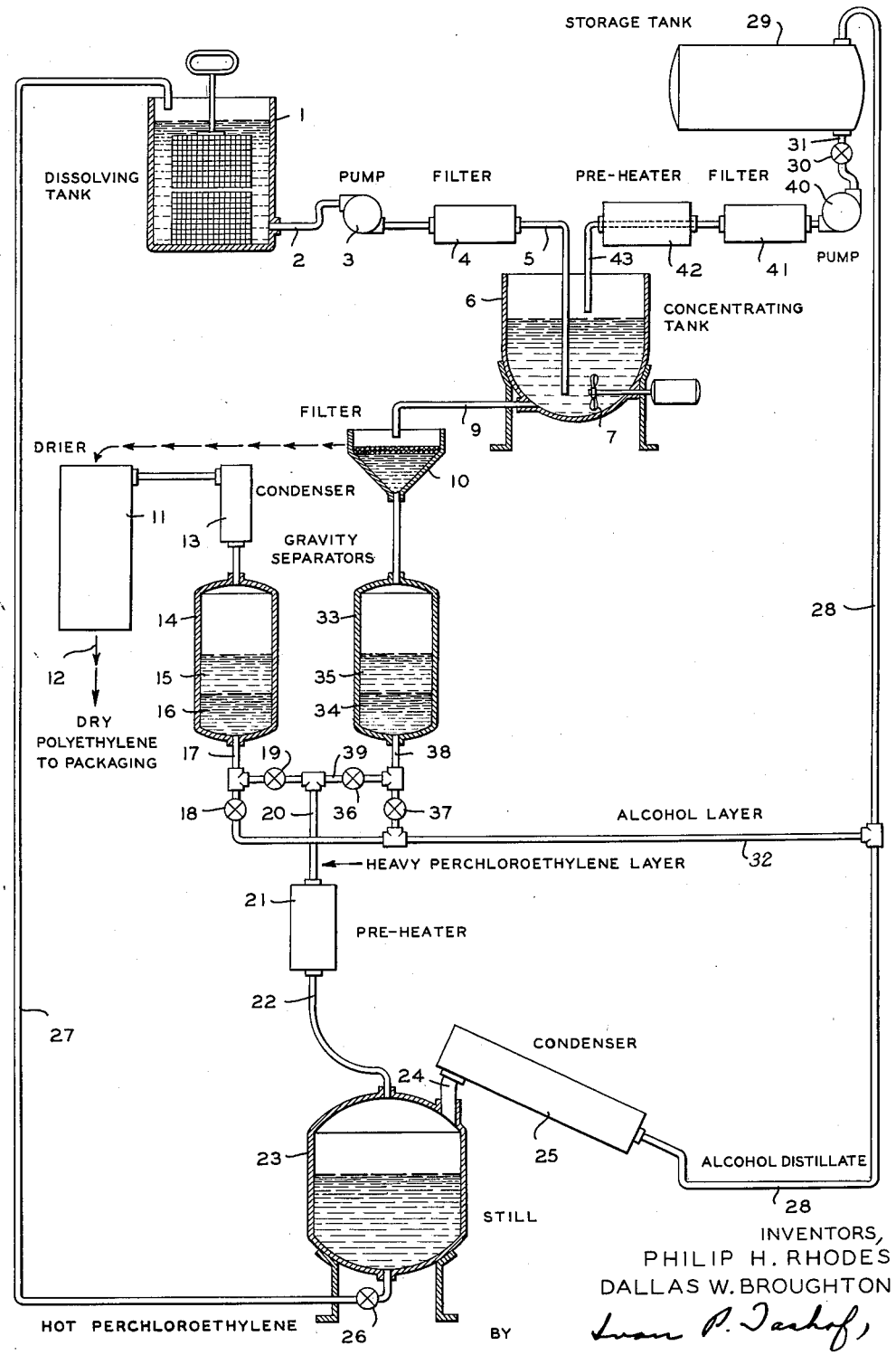

3,008,946
PRODUCTION OF POLYETHYLENE POWDER
Philip H. Rhodes, Cincinnati, Ohio, and Dallas W. Broughton, Garland, Tex., assignors to Nu-Plastics, Incorporated, Garland, Tex., a corporation of Texas
Filed May 25, 1956, Ser. No. 587,356
10 Claims. (Cl. 260—94.9)

The present invention is directed to the production of polyethylene powder of high bulk density.

While broadly in accordance with the present invention raw polyethylene material in any of its forms may be treated to produce particles of high bulk density, in one form of the invention polyethylene scrap is treated to recover discrete polyethylene particles.

As is well known, polyethylene is a thermoplastic resin made by the polymerization of ethylene under carefully controlled temperatures and pressures. Polyethylene has a waxy white translucent appearance and because of its flow characteristics and its inertness to metals, may be easily formed in itself or onto articles by extrusion or injection molding. By appropriate adaptation of thermoplastic techniques, the polyethylene may be formed into films, sheets, tubes, rods, tapes and filaments.

Polyethylene because of its highly desirable properties has found use in the wire and cable industry as a primary insulating material. Polyethylene when compounded with pigments and antioxidants is used as a coating for weatherproof wire.

When insulating wire and cable has served its useful purpose, the conductor has been reclaimed, but it has not been possible prior to the present invention to reclaim the polyethylene insulating coating present on the wire or cable.

The reclaiming of the conductor is usually effected by burning off the polyethylene insulating coating which has resulted not only in total loss of the polyethylene, but in some instances, in the oxidation of a substantial amount of conductor.

While the present invention can be used to recover the polyethylene coating from conductors, the basic principles thereof may be employed to produce a novel product having a bulk density which is between 100% and 150% greater than any polyethylene powder prepared by attrition, which is the customary manner at present utilized in the art of producing polyethylene powder.

The particles of polyethylene powder produced in accordance with the present invention have a bulk density broadly varying between 30 and 60 pounds per cubic foot, and more narrowly between about 40 pounds and 60 pounds per cubic foot, and in one form of the invention the bulk density of the polyethylene powder is between 50 and 60 pounds per cubic foot. In one form of the present invention, after the polyethylene has been dissolved in a solvent, there may be incorporated in the resulting polyethylene solution various materials, such as pigments, dyes, fillers, extenders, antioxidants to prevent discoloration, flameproofing agents, and the like, which are well known in the art. Further, other materials may be compounded in the polyethylene solution, such as any of the prior art resins, including polyisobutylene, polybutanes, waxes, and the like. Almost any material which has been previously compounded with polyethylene may be compounded therewith in accordance with the present invention, said material either being inert to the solvent for the polyethylene and inert with respect to the hereinafter set forth extracting medium, or that the material be soluble in the polyethylene solution, or that the material be compatible with the polyethylene and soluble in the polyethylene solvent but insoluble or relatively insoluble in the hereinafter set forth extracting medium. These materials are generically defined herein as conditioning materials. The latter in accordance with the present invention are integrally, uniformly, and homogeneously incorporated in the polyethylene particles or powder in a relatively simple and inexpensive manner, this being in contrast with the prior art methods of compounding with the polyethylene conditioning agents, such as pigments, fillers, flameproofing agents, resins, and the like, it being known that the incorporation of these agents have been previously performed by a conventional mechanical method which involves hot-working, the latter being a fairly difficult operation and fairly costly.

In accordance with the present invention, the polyethylene is dissolved in a solvent therefor to form a relatively dilute solution, and is then mixed with a non-solvent for the polyethylene, said non-solvent extracting a portion of the polyethylene solvent and producing a concentrated solution of polyethylene in the solvent. This concentrated solution of polyethylene in the solvent is then cooled until there is formed non-agglomeratable solidified particles of polyethylene solution carrying some solvent and some of said immiscible extracting medium. Thereafter, the solidified homogeneous polyethylene particles are separated from the liquid associated therewith, and said particles are dried, and during the drying there is separated from the resulting polyethylene particles their residual polyethylene solvent-content and their residual extracting medium-content.

In one form of the invention, the polyethylene content present in the polyethylene solution after the first extraction step may be further concentrated by treatment of said solution with a secondary extracting medium, said polyethylene solution being cooled to produce non-agglomeratable solidified particles of polyethylene solution carrying some solvent and some of the primary and secondary immiscible extracting medium. The solidified homogeneous polyethylene particles may be separated from the liquid associated therewith and thereafter subjected to a heat-treatment step which dries the particles and simultaneously separates from the particles their residual polyethylene solvent-content and their extracting media-content. It is desired to point out that upon the dissolving of the polyethylene in the solvent therefor and the treatment of said solution with an extracting medium to thereby produce a concentrated solution of polyethylene in its solvent, the concentration of the polyethylene in the solvent is raised to such a point that at room temperature the solution assumes a solid state, preferably in discrete particle form, and in this solidified form the polyethylene particles can be separated from the solution by any suitable method, as by filtering the solution, the solidified polyethylene particles containing portions of the polyethylene solvent and the primary polyethylene extracting medium being further treated as herein set forth. When the basic principles of the present invention are applied to the reclaiming of polyethylene from conductors, the metal conductor from which the polyethylene is removed and reclaimed is not oxidized or deteriorated, said wire having a much higher scrap resale value.

The citation of scrap wire and cable carrying a polyethylene component as one of the basic materials from which the polyethylene may be recovered is merely illustrative of suitable scrap materials which can be worked by the present invention. It is within the broad scope thereof to recover polyethylene from scrap filaments, sheets, tubes, rods, tapes, coated fabric, coated paper, molded objects in general, and similar products and articles.

The present invention will be illustrated by the application of the principles thereof to the reclaiming of polyethylene from metal conductors carrying a polyethylene insulating coating.

In accordance with the present invention, approximately 800 pounds of wire in the form of bundles containing approximately 250 pounds of polyethylene are introduced into a dissolving tank 1. There is also introduced into the dissolving tank 1 a solvent for the polyethylene coating present on the wire, said solvent illustratively being perchloroethylene having the formula $C_2Cl_4$, said material also being known as carbon dichloride and ethylene tetrachloride. It has a boiling point of approximately 121° C. The amount of the perchloroethylene introduced into the dissolving tank 1 is approximately 400 gallons, weighing about 5,600 pounds. The solvent for the polyethylene is maintained hot in order to facilitate quick solution of the polyethylene, and for the further purpose of maintaining the viscosity of the polyethylene and solvent relatively low so that it may be easily filtered. The perchloroethylene may be preheated to any desired degree below its boiling point, but illustratively to about 180° F. or in the alternative, the perchloroethylene may be introduced in the cold state into the dissolving tank 1 and the mixture of ingredients heated to about 170° or 180° F. The bundles of wire scrap which are disposed in the dissolving tank 1 have associated therewith not only the polyethylene insulating coating but other components such as fabric coating, paper coating, dirt, and the like. Therefore, after the polyethylene coating has been dissolved, the resulting mass is pumped through conduit 2, pump 3, and filter 4 whereby to remove the foreign particles therefrom and produce a purified solution of polyethylene dissolved in the perchloroethylene. Thereafter, the purified solution passes by conduit 5 into the concentrating tank 6 containing the agitator 7. Into the concentrating tank 6 there is introduced an extracting liquid which when in contact with the perchloroethylene solution of the polyethylene functions to extract or partially dissolve a portion of the perchloroethylene and in this manner effect a higher concentration of the polyethylene in the remaining perchloroethylene solvent.

Preferably the primary extracting agent is an isopropyl alcohol solution. This extracting solution is a composite extracting medium containing in addition to isopropyl alcohol a substantial amount of water including that present in 91% isopropyl alcohol and water accumulated from prior dissolving operations in carrying out the present invention. There is also present some of the polyethylene solvent from prior dissolving operations carried out in accordance with the present invention; that is, in this example, there is present perchloroethylene, this being the selected solvent for the polyethylene. Therefore, the composite extracting medium may comprise predetermined amounts of isopropyl alcohol, and predetermined amounts of the polyethylene solvent which is soluble in the aqueous solution of isopropyl alcohol. Preferably, although not necessarily, the primary extracting medium comprises a predominant portion of isopropyl alcohol as, for example, 50% or more, and a minor proportion of the polyethylene solvent as, for example, the halogenated hydrocarbon solvent used in the present example, and more specifically, perchloroethylene. More broadly, the isopropyl alcohol may be present in the extracting medium in an amount between 40% and 80% by volume, the perchloroethylene being present in an amount between 20% and 50% by volume, and the water being present in an amount between 5% and 15% by volume.

The composite extracting medium herein set forth is defined herein by the term "alcohol solution."

The alcohol extracting liquid which effects an increase in concentration of polyethylene in its solvent may be introduced in varying amounts, but desirably about 400 gallons or about 3,300 to 3,500 pounds are introduced into the concentrating tank 6 prior to the introduction therein of the polyethylene perchloroethylene solution. Preferably, the alcohol solution is heated prior to its introduction into the concentrating tank 6 in order to avoid cooling the solution of polyethylene during the concentration step which is effected in the concentrating tank 6. If the extraction medium as, for example, the isopropyl alcohol solution is relatively cool or cold when it contacts the solution of polyethylene in perchloroethylene, then the resulting concentrate of polyethylene solution is flocculent, irregular in shape, and extremely difficult to filter and dry. On the other hand, if the mixture of polyethylene in its solvent and the concentrating solution as, for example, isopropyl alcohol solution, is maintained at temperatures above 140–145° F. but below the temperature at which the alcohol solution boils, the polyethylene solution under agitation effected by the agitator 7 forms discrete dispersed liquid particles which are dispersed in the isopropyl alcohol extracting and concentrating solution.

The original solution of polyethylene in its dissolving solvent was approximately a 5% solution. By treatment with an extracting liquid for the solvent of the polyethylene as above described in concentrating tank 6, the concentration of the polyethylene in its solvent was increased from about 4½% to between 10% and 15% taken on the weight of the dispersed polyethylene solution. In other words, between 2,000 and 3,000 pounds of the solvent as, for example, perchloroethylene to dissolve the polyethylene has been absorbed by the extracting liquid, as typified by the isopropyl alcohol solution. The hot mixture present in concentrating tank 6 comprising the dispersed liquid balls of polyethylene in its solvent in admixture with a liquid as, for example, isopropyl alcohol solution containing the absorbed perchloroethylene solvent is cooled until the dispersed particles of polyethylene in its solvent are solidified and will no longer agglomerate.

In this example, solidification is effected at a temperature between about 135° and 145° F. It is not desired to be limited to this temperature range of cooling as with the employment of a different solvent for the polyethylene, and an extracting medium other than isopropyl alcohol solution, the temperature of cooling will be different, the important point being that the mixture be cooled under agitation until the particles of polyethylene and its solvent have solidified to the point where they no longer agglomerate. This solidification of the particles carrying part of the solvent therefor facilitates the later removal of the solvent both by means of filtration and subsequent drying.

The mixture of the solidified particles of polyethylene solution and the immiscible extraction fluid passes by means of conduit 9 to filter 10 where the solid particles are retained on the filter. The retained solid particles are removed from the filter by any suitable means and introduced into the drier 11 where the balance of the solvent and extracting liquid present in the particles is removed and recovered. The dry polyethylene particles 12 which are principally in the form of discrete spherical particles having a bulk density varying from approximately 30 to approximately 50 pounds per cubic foot may be then sent to the packaging room.

The drying operation in the drier 11 is effected at any suitable temperature which will effect drying without causing agglomeration of the polyethylene particles. It is desired to point out that the particles of polyethylene material which are introduced into the drier 11 contain a substantial amount of the solvent medium employed to bring the polyethylene in solution in the dissolving tank 1 and a minor amount of the extracting liquid which has displaced the solvent in the concentrating tank 6. The polyethylene composite material which is introduced into the drier 11 should, therefore, desirably be subjected to a relatively low drying temperature at the start of the drying operation so that there will be no agglomeration, the presence of a higher temperature at the start of the drying operation favoring agglomeration, and later after some of the solvent and extracting medium is evaporated from the composite particles, the temperature may be raised. Depending on the solvent employed and the extracting medium employed, the range of temperature within the drier will vary. In the present example the drier is maintained at a temperature of about 75° to about 80° F. initially and then the temperature is gradually raised until at the end of the drying period, the temperature is uniform at about 175° F. While it has been discovered that there must be a low temperature of drying at the beginning of the drying cycle and a higher temperature at the end of the drying cycle, the discovery does not reside principally in the temperature range and, therefore, it is not desired to be limited in the present invention to a specific drying range within the drier. The sole purpose of drying in the manner set forth is to prevent the discrete particles of polyethylene complex from agglomerating during the drying operation.

During the drying operation, there is evolved a mixture of vapors of the solvent and the extracting medium, and these vapors pass to the condenser 13 where they are cooled to a temperature which will effect condensation of the solvent and the extracting medium. In this particular example, the solvent is perchloroethylene and the extracting medium is an isopropyl alcohol solution as herein set forth. Therefore, the appropriate condensation temperature is within the range of about 50° to about 80° F. The condensate passes into the gravity separation tank 14. The condensate separates into two layers 15 and 16, the layer 16 being the heaviest and comprising in this example mainly the solvent perchloroethylene with some of the isopropyl alcohol and some water including that originally present in the isopropyl alcohol. The upper condensate layer 15 comprises mainly isopropyl alcohol with some water dissolved in it and a small amount of perchloroethylene. Connected to the gravity separator 14 is a conduit 17 provided with a valve 18. Connected in the line of the conduit 17 is a valve 19. During the condensation operation, both valves 18 and 19 are closed. When the period of condensation is finished, the valve 18 is closed and the valve 19 is opened and the heavy concentrate comprising mainly perchloroethylene passes by conduit 20 through preheater 21 where the temperature is raised above the boiling point of the extraction liquid and below the boiling point of the polyethylene solvent. In this particular example, the perchloroethylene boils at 248° F. and the isopropyl alcohol at about 179° F. Therefore, the temperature maintained in the preheater is about 200° F. The preheated liquid passes by conduit 22 to the still 23 which has attached thereto a conduit 24 connected to a condenser 25. Since the temperature of the liquid in the still is below the boiling point of the polyethylene solvent and above the boiling point of isopropyl alcohol, the latter vaporizes and passes to the condenser 25. The polyethylene solvent remains in a liquid state in the still and builds up or increases in volume until additional solvent is needed in the dissolving tank 1 whereupon the valve 26 is opened and the solvent passes by conduit 27 to the dissolving tank 1.

The extracting liquid which is condensed in the condenser 25 as, for example, the isopropyl alcohol solution, passes by conduit 28 to the storage tank 29 provided with a conduit 31 and a valve 30. The valve 30 remains in closed condition and the alcohol solution distillate builds up in the storage tank.

Referring again to gravity separator 14, after the heavy perchloroethylene liquid has been removed therefrom, the valve 19 is closed and the valve 18 is opened. Thereupon, the light extracting medium which is principally alcohol, passes via conduit 32 to conduit 28 and then into the storage tank 29, where it mixes with the alcohol distillate recovered from the condenser 25.

Referring to the liquid which passes through the filter 10, this liquid which has heavy and light components, the heavy component consisting principally of solvent as, for example, perchloroethylene, and the light component consisting principally of extracting medium as, for example, isopropyl alcohol, passes to the gravity separator 33, wherein there is formed the heavy layer 34 and the lighter layer 35. During the period when the liquid is passing to the gravity separator 33, the valves 36 and 37 are closed. When filtration is completed, the valve 36 is opened and the heavy liquid 34 passes by conduits 38 and 39 to conduit 20 and into the preheater 21 where the liquid is processed as hereinbefore set forth. When the heavy liquid 34 has been removed from the gravity separator 33, the valve 36 is closed and the valve 37 is opened and the light liquid, which is principally the alcohol extracting medium, passes by way of conduit 32 to the storage tank 29.

When the concentration tank 6 is readied for the treatment of another batch of polyethylene solution, there is introduced into the concentrating tank the appropriae amount of alcohol. This is effected by opening the valve 31 and passing the alcohol by means of a pump 40 through the filter 41 and then into the preheater 42 from which the extracting medium, that is, the alcohol solution in this specific example, passes through conduit 43 into the concentrating tank 6. The extracting medium present in the preheater 42 is heated in order to keep the composite liquid present in the concentrating tank 6 in a fluid state.

It is desired to point out that in this specific example the isopropyl alcohol used is a 91% isopropyl alcohol, that is, it contains 9% of water, and this water is carried through the operation repeatedly.

In operating as set forth using about 250 pounds of polyethylene and about 400 gallons of perchloroethylene solvent, that is, about 5,600 pounds, the period of operation is approximately one hour for a complete cycle. This does not include the drying of the polyethylene particles as herein set forth.

As previously set forth, the precipitating or extracting alcohol solution is a composite extracting medium which may contain isopropyl alcohol, the halogenated hydrocarbon, or other hydrocarbon, or any solvent used for dissolving the perchloroethylene together with water. In the example above set forth, the composite extracting medium is obtained after several cycles have been completed and after substantial equilibrium has been established in the extraction solution. In actual operation the specific gravity of the extracting alcohol solution which, as set forth, is a composite extraction solution or medium, may vary between about 1.000 to about 1.200 with the most satisfactory results being obtained when the specicc gravity of the extracting alcohol solution is in the range of about 1.090 to about 1.130, with water present in the alcohol extracting solution comprising 7% to 15% by volume. Isopropyl alcohol of 91% grade has a specific gravity at 20° C. of between 0.8175 and 0.8186. While 87.5% isopropyl alcohol containing not more than 12.5% by weight of water may be used in initiating the extraction process, it is preferred to use the 91% isopropyl alcohol. Based on specific gravity ranges, it is clear that the composite isopropyl alcohol solution contains additional ingredients such as specified.

In the specific aspect of the present invention, a wide range of isopropyl alcohol, water and chlorinated solvent, including perchloroethylene, may be used as the extracting solution or medium. It is not desired that the extraction medium be restricted to any specific mixture of the extraction liquids above set forth, as the invention resides specifically in the steps of dissolving the polyethylene, concentrating the solution by extraction, separating the solid solution of polyethylene, and drying the same, rather than in the use of specific solvents and extracting medium to accomplish the purposes set forth. Hence, the polyethylene-solvent-extraction medium-system is set forth by way of illustration.

Instead of using perchloroethylene as the solvent for the polyethylene, the latter may be dissolved in any prior art solvent, that is, any solvent in which the polyethylene is soluble at temperatures between 80° and 100° C., although the polyethylene begins to dissolve at temperatures around 60° C. In addition to the halogenated hydrocarbons, the polyethylene can be dissolved in toluene and xylene. The following chlorinated or halogenated hydrocarbons may be used: tetrachloroethane, CHCl$_2$.CHCl$_2$; dichloroethane, CH$_2$Cl.CH$_2$Cl; trichlorethane, CHCl=CCl$_2$; carbon tetrachloride, CH$_4$. The above chlorinated hydrocarbons may be generically defined as those chlorinated hydrocarbons having a boiling point below about 300° F. and above 80° F. The solvent may also be generically defined as the chlorinated compounds of paraffin hydrocarbons selected from the group consisting of methane and ethane. Instead of using isopropyl alcohol as an ingredient of the extracting solution, there may be used an alcohol having the formula C$_n$H$_{2n+1}$OH where $n$ is an integer between 1 and including 3.

Prior to the introduction of said particles into the drier, they may be dispersed in an equal volume of a secondary extraction liquid or medium which extracts an additional amount of polyethylene solvent from the composite polyethylene particles and raises the polyethylene solids in the particles from the initial amount of about 10% to about 15%, to between about 20% and 25%. Suitable secondary solvents are acetone, methyl ethyl ketone, methyl propyl ketone, diethyl ketone, and similar paraffin ketones. These ketones may be defined by the generic formula

where R and R' are paraffin radicals or chains, each having from 1 to 3 carbon atoms. R and R' may be different radicals. Polyethylene particles which have been subjected to treatment with a secondary extraction medium when dried have a higher bulk density than the polyethylene particles which have only been subjected to a primary extraction treatment. In other words, the bulk density of the polyethylene particles which were dried without treatment with secondary extractant is between 30 and 50 pounds per cubic foot. When the particles are treated prior to the introduction into the drier 11 with a secondary extraction medium and then dried, the bulk density of the finally dried polyethylene particles is between 40 pounds and 60 pounds per cubic foot. The treatment with the secondary extracting medium accelerates the drying of the polyethylene particles in drier 11 because there is less polyethylene solvent as, for example, chlorinated hydrocarbon or other hydrocarbon to be evaporated, but it does require the addition of another still to separate the chlorinated hydrocarbon or other polyethylene solvent from the secondary extractant which in the preferred form of the invention is acetone.

Polyethylene is compatible in all proportions with butyl rubber (GR-I), Buna S (GR-S), polyisobutylene. Polyethylene is compatible in limited proportions with neoprene GN, paraffins, and coumarone-indene resins. Therefore, these materials, as well as many others including waxes, chlorinated hydrocarbons, pigments and dyes, may be incorporated in the polyethylene solution prior to treatment with the extracting medium, it only being necessary that the conditioning material added, the latter including those herein enumerated, and many others, be soluble in or dispersable in the polyethylene solution and relatively insoluble in the extracting liquid or medium.

Prior art pigments which may be utilized are titanium dioxide, chrome yellow, chrome green, cadmium reds, antimony oxide, toluidine toners, and the like.

Prior art fillers which may be used are calcium carbonate, clays, powdered gypsum, powdered slate, metallic powders, carbon black, and the like.

Prior art flame retardants which may be used include the chlorinated paraffins, chlorinated biphenyls, and the like.

It is pointed out that the compounded polyethylene produced by the present invention represents a substantially more uniform product than that produced by the hot-melt mechanical working operations of the prior art inasmuch as both polyethylene and the conditioning agent are intimately mixed during a state of extremely fine dispersion.

While in the illustrative example the concentration of polyethylene in solution is relatively low, that is about 5%, more concentrated solutions may, of course, be utilized; it only being necessary that the solution be fluid under the operating conditions dictated by the particular solvent and extractants being used.

What is claimed is:

1. The method of producing discrete spherical particles of polyethylene of high bulk density having conditioning materials integrally, homogeneously and uniformly distributed therethrough comprising dissolving polyethylene in a solvent therefor and forming a hot dilute liquid solution of polyethylene in the solvent, the latter being selected from the group of solvents consisting of chlorinated paraffin hydrocarbons having a boiling point below about 300° F. and above about 80° F., and aromatic hydrocarbons; introducing into the so-formed polyethylene solution a conditioning material selected from the group of conditioning materials consisting of pigments, fillers, antioxidants, and flame retardants, mixing the resulting polyethylene solution with a liquid extractant while agitating the mixture, said extractant being a non-solvent of the polyethylene and at least partially immiscible with said polyethylene solvent and extracting and dissolving a portion of the polyethylene solvent from the solution of polyethylene in said solvent and producing a solution of polyethylene having a concentration at least double that of the original solution, said concentrated solution of polyethylene being in the form of liquid particles, said particles being dispersed in a mixture of said extractant and the extracted polyethylene solvent; cooling the resulting dispersion while agitating the latter until there is formed non-agglomeratable solid particles comprising polyethylene, said conditioning material, some of the polyethylene solvent, and some extractant; separating the solidified homogeneous particles having the conditioning material integrally and homogeneously distributed therethrough; drying said particles and separating therefrom during drying residual solvent and extractant, and recovering discrete spherical particles of polyethylene, said extractant comprising at least about 50% by volume of a lower alkyl alcohol and between 5% and 15% water, said alcohol having a formula C$_n$H$_{2n+1}$OH where $n$ is an integer between 1 and 3.

2. The method defined in claim 1 in which the conditioning material is a pigment.

3. The method of producing a polyethylene powder of high bulk density comprising dissolving polyethylene in a solvent therefor and forming a hot dilute liquid solution of polyethylene in the solvent, the latter being selected from the group of solvents consisting of chlorinated paraffin hydrocarbons having a boiling point below about 300° F. and above about 80° F., and aromatic hydrocarbons; mixing the resulting solution with a liquid extractant while agitating the mixture, said extractant being a non-solvent of the polyethylene and extracting and dissolving a portion of the polyethylene solvent from the solution of polyethylene in said solvent to thereby effect a higher concentration of polyethylene in this solvent to produce a dispersion of discrete liquid particles of polyethylene dissolved in its solvent dispersed in a mixture of said extractant and the extracted polyethylene solvent, said extractant comprising at least about 50% by volume of a lower alkyl alcohol and between 5% and 15% water, said alcohol having the formula $C_nH_{2n+1}OH$ where $n$ is an integer between 1 and 3; cooling the resulting dispersion while agitating it until there is formed non-agglomeratable solid particles comprising polyethylene, the solvent therefor, and some of the extractant; separating the solidified homogeneous particles from the liquid associated therewith; and drying said particles, and separating therefrom during drying residual solvent and extractant.

4. The method of producing discrete spherical particles of polyethylene of high bulk density comprising dissolving polyethylene in a solvent therefor and forming a hot dilute liquid solution of polyethylene in the solvent, the latter being selected from the group of solvents consisting of chlorinated paraffin hydrocarbons having a boiling point below about 300° F. and above about 80° F., and aromatic hydrocarbons; mixing the resulting solution with a liquid extractant while agitating the mixture, said extractant being a non-solvent of the polyethylene and extracting and dissolving a portion of the polyethylene solvent from the solution of polyethylene in said solvent to thereby effect a higher concentration of the polyethylene in the solvent to produce a dispersion of discrete liquid particles of polyethylene dissolved in its solvent dispersed in a mixture of said extractant and the extracted polyethylene solvent, said extractant comprising at least about 50% by volume of a lower alkyl alcohol and between 5% and 15% water, said alcohol having the formula $C_nH_{2n+1}OH$ where $n$ is an integer between 1 and 3; cooling the resulting dispersion while agitating the latter until there is formed non-agglomeratable solid particles comprising polyethylene, the solvent therefor and some extractant; separating the solidified homogeneous particles from the liquid associated therewith; drying said particles and separating therefrom during drying residual solvent and alcohol extractant; the temperature of drying being graduated from an initial temperature at which agglomeration of the polyethylene particles is substantially inhibited, and a portion of the polyethylene solvent, and a portion of the extractant is removed, to a finishing temperature at which substantially all of the polyethylene solvent and the extractant for said solvent is removed, and recovering discrete spherical particles of polyethylene.

5. The method of producing discrete spherical particles of polyethylene of high bulk density comprising dissolving polyethylene in a solvent therefor and forming a hot dilute liquid solution of polyethylene in the solvent, the latter being selected from the group of solvents consisting of chlorinated paraffin hydrocarbons having a boiling point below about 300° F. and above about 80° F., and aromatic hydrocarbons; mixing the resulting solution with a liquid extractant while agitating the mixture, said extractant being a non-solvent of the polyethylene and extracting and dissolving a portion of the polyethylene solvent from the solution of polyethylene in said solvent to thereby effect a higher concentration of the polyethylene in the solvent to produce a dispersion of discrete liquid particles of polyethylene dissolved in its solvent dispersed in a mixture of said extractant and the extracted polyethylene solvent, said extractant comprising at least about 50% by volume of a lower alkyl alcohol and between 5% and 15% water, said alcohol having the formula $C_nH_{2n+1}OH$ where $n$ is an integer between 1 and 3; cooling the resulting dispersion while agitating the latter until there is formed non-agglomeratable solid particles comprising polyethylene, the solvent therefor and some extractant; separating the solidified homogeneous particles from the liquid associated therewith; drying and separating in vapor form from the resulting polyethylene particles their residual polyethylene solvent-content and extractant-content, while substantially inhibiting agglomeration of said particles during drying; condensing said vapors; separating the resulting condensate into a heavy layer comprising principally the polyethylene solvent and a minor amount of the extractant, and a lighter layer comprising principally the extractant and a minor amount of the polyethylene solvent; separately recovering from said layers the polyethylene solvent and extractant, and recovering discrete spherical particles of polyethylene.

6. The method of producing discrete spherical particles of polyethylene of high bulk density comprising dissolving polyethylene in a solvent therefor and forming a hot dilute liquid solution of polyethylene in the solvent, the latter being selected from the group of solvents consisting of chlorinated paraffin hydrocarbons having a boiling point below about 300° F. and above about 80° F., and aromatic hydrocarbons; mixing the resulting solution with a liquid extractant while agitating the mixture, said extractant being a non-solvent of the polyethylene and extracting a portion of the polyethylene solvent from the solution of polyethylene in said solvent to thereby effect a higher concentration of the polyethylene in the solvent to produce a dispersion of discrete liquid particles of polyethylene dissolved in its solvent dispersed in a mixture of said extractant and the extracted polyethylene solvent, said extractant comprising at least about 50% by volume of a lower alkyl alcohol and between 5% and 15% water, said alcohol having the formula $C_nH_{2n+1}OH$ where $n$ is an integer between 1 and 3; cooling the resulting dispersion while agitating the latter until there is formed non-agglomeratable solid particles comprising polyethylene, the solvent therefor and some extractant; mixing said solid particles containing polyethylene solvent and some extractant with a secondary extractant having the formula

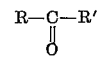

where R and R' are selected from the group consisting of a paraffin radical and a paraffin chain each containing 1 to 3 carbon atoms which extracts an additional amount of solvent from said particles but leaves therein a residual portion; drying and separating from the so-produced polyethylene particles their remaining solvent-content and extractant-content, and recovering discrete spherical particles of polyethylene.

7. The method of producing discrete spherical particles of polyethylene of high bulk density comprising dissolving polyethylene in a solvent therefor and forming a hot dilute liquid solution of polyethylene in the solvent, the latter being selected from the group of solvents consisting of chlorinated paraffin hydrocarbons having a boiling point below about 300° F. and above about 80° F., and aromatic hydrocarbons; mixing the resulting solution with a liquid extractant while agitating the mixture, said extractant being a non-solvent of the polyethylene and extracting and dissolving a portion of the polyethylene solvent from the solution of polyethylene in said solvent to thereby effect a higher concentration of the polyethylene in the solvent to produce a dispersion of discrete liquid particles of polyethylene dissolved in its solvent dispersed in a mixture of said extractant and the extracted polyethylene solvent, said extractant comprising at least about 50% by volume of a lower alkyl alcohol and between 5% and 15% water, said alcohol having the formula $C_nH_{2n+1}OH$ where $n$ is an integer between 1 and 3; cooling the resulting dispersion while agitating the latter until there is formed non-agglomeratable solid particles comprising polyethylene, the solvent therefor and some extractant, separating the solidified homogeneous particles from the liquid associated therewith, the latter forming a filtrate; drying and separating in vapor form from the resulting polyethylene particles their residual polyethylene solvent-content and extractant, while substantially inhibiting agglomeration of said particles during drying, condensing said vapors, separating the resulting condensate into a heavy layer comprising principally the polyethylene solvent and a minor amount of the extractant, and a lighter layer comprising principally the extractant and a minor amount of the polyethylene solvent; separately recovering from said layers the polyethylene solvent and extractant; separating said filtrate into a heavy liquid layer comprising principally polyethylene solvent and some extractant and a lighter liquid layer comprising principally extractant and some polyethylene solvent; separately recovering from said layers their solvent-content and extractant-content and recovering discrete spherical particles of polyethylene.

8. The method of recovering discrete spherical particles of polyethylene of high bulk density comprising dissolving polyethylene at a temperature above 60° C. in a solvent therefor and forming a hot dilute liquid solution of polyethylene in the solvent, the latter being selected from the group of solvents consisting of chlorinated paraffin hydrocarbons having a boiling point below about 300° F. and above about 80° F., and aromatic hydrocarbons; mixing the resulting solution with a liquid extractant while agitating the mixture, said extractant being a non-solvent of the polyethylene and extracting and dissolving a portion of the polyethylene solvent from the solution of polyethylene in said solvent and at least doubling the concentration of the polyethylene in the solvent, said concentrated solution of polyethylene being in the form of liquid particles, said particles being dispersed in a mixture of said extractant and the extracted polyethylene solvent; cooling the resulting dispersion while agitating the latter until there is formed non-agglomeratable solid particles comprising polyethylene, the solvent therefor and some extractant, separating the solidified homogeneous particles from the liquid associated therewith; drying said particles and separating therefrom during drying residual solvent and extractant, and recovering discrete spherical particles of polyethylene, said extractant comprising at least about 50% by volume of a lower alkyl alcohol and between 5% and 15% water, said alcohol having a formula $C_nH_{2n+1}OH$ where $n$ is an integer between 1 and 3.

9. The method of recovering discrete spherical particles of polyethylene of high bulk density comprising dissolving polyethylene at a temperature above 60° C. in a solvent therefor and forming a hot dilute liquid solution of polyethylene in the solvent, the latter being selected from the group of solvents consisting of chlorinated paraffin hydrocarbons having a boiling point below about 300° F. and above about 80° F., and aromatic hydrocarbons; mixing the resulting solution with a primary liquid extractant while agitating the mixture, said extractant being a non-solvent of the polyethylene and at least partially immiscible with said polyethylene solvent and extracting and dissolving a portion of the polyethylene solvent from the solution of polyethylene in said solvent and at least doubling the concentration of the polyethylene in the solvent, said concentrated polyethylene solution being in the form of liquid particles, said particles being dispersed in a mixture of said extractant and the extracted polyethylene solvent; cooling the resulting concentrated polyethylene solution while agitating the latter until there is formed non-agglomeratable solid particles comprising polyethylene, the solvent therefor and some extractant; mixing said solid particles containing polyethylene solvent and extractant with a secondary extractant which extracts an additional amount of solvent from said particles but leaves therein a residual portion; drying the resulting particles and separating therefrom during drying residual solvent and reactant, and recovering discrete spherical particles of polyethylene, said primary extractant comprising at least 50% by volume of a lower alkyl alcohol and between 5% and 15% water, said alcohol having the formula $C_nH_{2n+1}OH$ where $n$ is an integer between 1 and 3; said secondary extractant having the formula

where R and R' are selected from the group consisting of a paraffin radical and a paraffin chain each containing 1 to 3 carbon atoms.

10. The method of producing discrete spherical particles of polyethylene of high bulk density comprising forming a mixture of polyethylene dissolved in a hydrocarbon solvent selected from the group of solvents consisting of chlorinated paraffin hydrocarbons having a boiling point below about 300° F. and above about 80° F., and aromatic hydrocarbons, a lower alkyl alcohol, and water, the resulting aqueous solution of alcohol being a non-solvent of the polyethylene and immiscible with the polyethylene solvent; cooling the resulting dispersion while agitating until there is formed, due to the presence of water, non-agglomeratable discrete solid particles comprising polyethylene, the solvent therefor, and some of the alcohol solution; separating the solid discrete particles from the liquid associated therewith; and drying said particles and separating therefrom during drying the residual polyethylene solvent and the residual aqueous lower alkyl alcohol solution; said alcohol having the formula $C_nH_{2n+1}OH$ wherein $n$ is an integer between 1 and 3.

References Cited in the file of this patent

UNITED STATES PATENTS

| | | |
|---|---|---|
| 2,313,144 | Gomm | Mar. 9, 1943 |
| 2,628,172 | Jenett | Feb. 10, 1953 |
| 2,691,647 | Field et al. | Oct. 12, 1954 |
| 2,831,845 | Biddle et al. | Apr. 22, 1958 |
| 2,870,113 | Jones | Jan. 20, 1959 |

FOREIGN PATENTS

| | | |
|---|---|---|
| 571,814 | Great Britain | Sept. 11, 1945 |
| 688,403 | Great Britain | Mar. 4, 1953 |